United States Patent
Heinonen et al.

(10) Patent No.: US 6,671,370 B1
(45) Date of Patent: Dec. 30, 2003

(54) METHOD AND APPARATUS ENABLING A CALLING TELEPHONE HANDSET TO CHOOSE A RINGING INDICATION(S) TO BE PLAYED AND/OR SHOWN AT A RECEIVING TELEPHONE HANDSET

(75) Inventors: Eeva-Liisa Heinonen, Tampere (FI); Jaakko Itävaara, Kirkkonummi (FI); Heidi Karves, Tampere (FI); Kai Kronström, Helsinki (FI); Kari Lehtinen, Tampere (FI); Jari Mononen, Ruutana (FI); Petri Nykänen, Tampere (FI); Mikko Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/469,201

(22) Filed: Dec. 21, 1999

(51) Int. Cl.[7] .................................................. H04M 3/00
(52) U.S. Cl. ........................... 379/373.02; 379/207.16; 379/251; 379/252
(58) Field of Search ........................ 379/373.02, 207.16, 379/251, 252

(56) References Cited

U.S. PATENT DOCUMENTS 5,228,080 A * 7/1993 Nutter et al. .......... 379/373.02
6,031,899 A * 2/2000 Wu ............................. 379/133

FOREIGN PATENT DOCUMENTS

| WO | WO 93/17531 | 9/1993 |
| WO | WO 01/41405 A1 | 7/2001 |

* cited by examiner

Primary Examiner—Ahmad F. Matar
Assistant Examiner—Karen Le

(57) ABSTRACT

A telephone system includes a plurality of telephone terminals wherein a call that is placed from a calling telephone terminal to a receiving telephone terminal is announced by activating a standard ringing indication at the receiving telephone terminal. A data file is provided having a plurality of different ringing indications therein. These ringing indications include a plurality of sound information that are both different from each other and different from a standard ringing tone, and a plurality of different visual information. When a call is placed from a calling telephone terminal to a receiving telephone terminal, the user at the calling telephone terminal may optionally elect to announce the call at the receiving-telephone-terminal using ringing indication that is selected from the data-file, for example sound information that indicates the identity of the calling-users, and/or visual information that indicates the priority of the call.

11 Claims, 6 Drawing Sheets

500

| MISSED CALLS | |
|---|---|
| 501 — 1 MARY HOPPINS | 12:32 |
| MIKE O'CONNOR | 12:15 |
| 502 — ¦ PETE JONES | 11:14 |
| 503 — ! JANE DOE | 10:00 |

*FIG. 5*

METHOD AND APPARATUS ENABLING A CALLING TELEPHONE HANDSET TO CHOOSE A RINGING INDICATION(S) TO BE PLAYED AND/OR SHOWN AT A RECEIVING TELEPHONE HANDSET

BACKGROUND OF THE INVENTION

1. Field of the Invention

This invention relates to the field of wired, wireless or radio telecommunications, and more specifically to the field of telephone systems of which an office or a building telephone system are nonlimiting examples.

2. Description of the Related Art

As used herein, the term "ringing information" means any form of information, such as sound information and/or visual information, that is selected by a user at a calling telephone, and that is sent with a telephone phone call that is placed from the calling telephone to a receiving telephone. The form of ringing information can be a file, a search path for a file (in a server, in a telephone terminal, in a data file), a priority mark or bit, etc.

The term "ringing indication" is any indication that operates at the receiving telephone to "wake up" the receiver or receiving telephone, this wake up indication usually being in the form of sound information and/or visual information. Sound information may comprise a ringing tone, a sound file, etc. Visual information may comprise icons, a video file, etc.

A ringing indication(s) is provided to the receiving telephone in order to wake up the receiving telephone, or more specifically, in order to announce to a user at the receiving telephone that an incoming telephone call has arrived. As a result of receiving a ringing indication, usually in the form of sound information and/or visual information, sound information and/or visual information is shown at the receiving telephone.

It is common that a user can select the ringing tone of his/her telephone based upon the personal preference of the user. Every time a telephone call is thereafter received by the user, his/her phone will announce the arrival of the call by way of the preselected ringing tone.

It is also known that a caller-ID function can by provided whereby the origin of an incoming telephone call is announced on a visual display, thus enabling the recipient of the incoming call to make a decision relative to answering the call by picking up the handset, recording the call for later review, or ignoring the call.

In addition, most graphical e-mail systems provide that an e-mail message can contain a priority bit that marks the importance of the message as high, low, or normal. This feature enables the sender of an e-mail message to classify the importance of the message, and enables the receiver of the message to access the message as a function of its importance.

The concept of selectively providing for the special handling of priority calls within a mobile radiotelephone system is taught, for example, by published International Application No. WO 93/17531 (PCT/SE93/00145). More specifically, priority is realized in a cellular mobile telephone system by ascertaining that a call should be given priority, by classifying the call as a priority call when it is ascertained that priority should be given, by assigning channels preferentially to the priority call, by assigning higher quality channels preferentially to the priority call, and by through connecting or completing both ways of connection of the priority call including in allowing for more extensive paging of a mobile station than would be allowed if the call were not a priority call. This call priority service is typically offered as a premium service. Factors used in determining when a call will be granted priority include the telephone number of the call originating party, the telephone number of the call-receiving party, user information that designated a party as being entitled to priority, and telephone emergency numbers (i.e. fire, police, etc.).

It would be desirable to provide a telephone system that enables a calling user to predetermine the ringing indication that will be played or sounded and/or shown or displayed at the location of the receiving user wherein the calling user operates on-line and prior to the calling user actually placing the call. In this way, the calling user within the telephone system can, with only selected calls, announce the origin of a call to a receiving user that is within the telephone system before the receiving user actually picks up the receiving handset to answer the call. It would additionally be desirable that the calling user provide call priority information by way of sound information and/or by way of visual information at the receiving user's telephone terminal.

SUMMARY OF THE INVENTION

This invention provides for the sending or pushing of a user-selected ringing information to the recipient of a telephone call, all within the confines of a telephone system. That is, ringing information that specifies a ringing indication, such as sound information and/or visual information as preselected by a calling user, is selectively sent to a receiving telephone terminal to wake up the receiving telephone terminal and to announce the origin and/or the importance of an incoming call.

In accordance with this invention, a file, or a search path for a file, a priority mark or bit is sent with a telephone call that is placed by a calling telephone terminal to a receiving telephone terminal. The file that is sent to the receiving telephone terminal may be a ringing tone file, an icon file, etc., and it may be an audio file such as a wav file, an image file such as bmp, a video file such as mp2, etc.

When a search path for a file is sent to the receiving telephone terminal, this search path enables the receiving telephone terminal to fetch a ringing indication as was specified by the calling telephone terminal, and this fetched ringing indication is then used to announce the arrival of the call at the receiving telephone terminal by way of the fetched ringing indication, for example, fetched sound information (audio character) and/or fetched visual information (visual character).

While the invention will be described while making reference to ringing tones and/or visual icons, it is within the spirit and scope of this invention to announce the arrival of the call at the receiving telephone terminal using virtually any form of a wake-up ringing indication, of which sound information and visual information are but two examples.

While the invention will be described in detail while making reference to a telephone system such as a private or a non-public telephone system, the spirit and scope of the invention is not to be limited to this utility. For example, the invention also finds utility in a global system for mobile communications (GSM).

In accordance with the invention, the calling user within the telephone system optionally selects ringing information in the form of ringing indication(s) from a data file in a server, in a telephone handset, in the telephone system, before a telephone number is dialed. Upon completion of a connection to a recipient's handset, the selected ringing indication is active at the recipient handset to indicate how to wake up the recipient handset, and the recipient of the call can then use this ringing indication to determine whether or not to immediately answer the incoming telephone call, to record the incoming call for later review, or to ignore the incoming call.

The use of a ringing indication in the form of visual information is especially useful when the recipient handset's ringing function has been set to a low volume state or to an off state.

In accordance with this invention, a calling user uses his/her phone to pre-select ringing information in the form of a ringing indication(s) from a data file whose sound information/visual information content is preferably known to all of, or at least some of, the telephone terminal users within the telephone system. As a feature of the invention this selection from the data file may be made by way of a well-known touchscreen. Once the selection(s) has been made, the caller dials the telephone number of the intended receiving user. The ringing information (or digital bits that represent and identify the ringing information) is then sent to the receiving user for example, on a call header that operates to set the receiving telephone terminal to receive the ringing information or to access the identified ringing indication from the data file; i.e., the selected portion of the data file and/or an indication/identification thereof is sent to the receiving telephone terminal. The receiving telephone terminal that is within the telephone system now suspends the call-received process until the ringing information is received by the receiving telephone terminal. The user at the receiving telephone terminal now hears and/or sees the pushed or sent ringing indication at his/her telephone terminal; i.e., the receiving telephone terminal is awakened.

In accordance with this invention, ringing information, or a ringing information file is sent from a calling telephone to a receiving telephone. When an data address is sent, the data address tells the receiving telephone from where in a data file the ringing indication (for example, sound information and/or visual information) that was selected by the calling telephone is to be fetched (for example, from a data file in the receiving telephone, from a server, by way of a search path, etc.).

As a feature of the invention, the receiving user may set the receiving telephone terminal to disable operation of the invention, or to store received or incoming calls along with the sent ringing information.

As an additional feature of the invention, the ringing indication that is active at the recipient handset additionally provides a priority indicator that alerts the recipient of the priority of an incoming call, which priority is designated by the sender and assigned at the physical location of the calling hand set. As an example of this feature of the invention, a priority bit, or flag, indicates the importance of the call being received as high importance, as low importance, or as normal importance. This priority indication can be provide by visual information that appears on a screen that is associated with the recipient handset, and/or by sound information that is recognized by the recipient as identifying different priority levels (for example, a high importance call, a low importance call, or a normal call). In accordance with this feature of the invention, an incoming call can also be labeled as a private call or a business call. In this way, the caller is free to choose the priority of the call, and the recipient remains free to choose how to handle the incoming call.

In an embodiment of the invention, but without limitation thereto, the invention is implemented in a Wireless Local Area Network (WLAN). The invention is handset or terminal dependent, the invention makes use of sound files and/or visual files, and the invention does not affect the network behavior of another telephone system to which the telephone system may be connected.

In sending ringing information to a recipient handset, the calling handset utilizes an H.323 setup message by way of which a search path is sent to a data file that is associated with the calling handset and with the recipient handset. The recipient handset then retrieves a user selected ringing indication based upon receiving ringing information from the network server. In a cellular system, the search path to the data file is transmitted in the setup message, and the calling handset uses the same protocol; for example, WAP, to retrieve the data file from the network server of the telephone system.

The priority of a call can be set to high, low, or normal wherein the actual indication that is active (played or shown) at the recipient handset depends on the implementation of the invention, for example, a visual display of an upward pointing arrow for high priority, a downward pointing arrow for low importance, and a vertically-extending line for normal importance.

An object of the invention is to enable a caller to indicate the origin of a call by way of a ringing indication(s) that is selected by the caller and that is known to the recipient as identifying the particular caller, and/or is know as containing information that is to be transmitted to the recipient without requiring that the recipient answer the call. By way of example, and as a feature of the invention, a visually-observable icon can be selected to wish the recipient a happy birthday.

Another object of the invention is to enable a caller to decide how an incoming telephone call is handled at the receiving handset or terminal, wherein priority can be indicated by visual information and/or by sound information. An example utility of this feature of the invention is when a call-waiting signal is received by a user, wherein the user can decide to accept or ignore the call-waiting signal based upon a priority that is provided by operation of the present invention.

Another object of the invention is to enable a caller to indicate the occurrence of an important event to the recipient by way of a ringing indication(s) that, when activated at the recipient handset, alerts the recipient to the occurrence of the important event; for example, a burglary, or the arrival of a guest at the reception desk of a business establishment. Such a notice giving ringing indication(s) need not be "answered" at the location of the recipient handset in order for the ringing indication(s) to effectively convey its message.

These and other objects, advantages and features of the invention will be apparent to those of skill in the art upon reference to the following detailed description, which description makes reference to the drawing.

BRIEF DESCRIPTION OF THE DRAWING

FIG. 5 shows a screen display at one of the FIG. 2 handset terminals, this figure showing four calls that have been stored at that handset terminal, along with the name of the person originating each call, the time of arrival of each call, and in the case of three of the calls, a priority icon for each of the three calls.

DESCRIPTION OF THE PREFERRED EMBODIMENT

While the invention has been particularly shown and described with reference to a specific telephone system embodiment thereof, it will be understood by those skilled in the art that various other changes in the form and details may be made without departing from the spirit and scope of the invention.

Presently, preferred embodiments of the invention and its many improvements will now be described with a degree of particularity. It should be understood, however, that this description is made by way of example, and that the invention is defined by the scope of the following claims.

Figure 1:
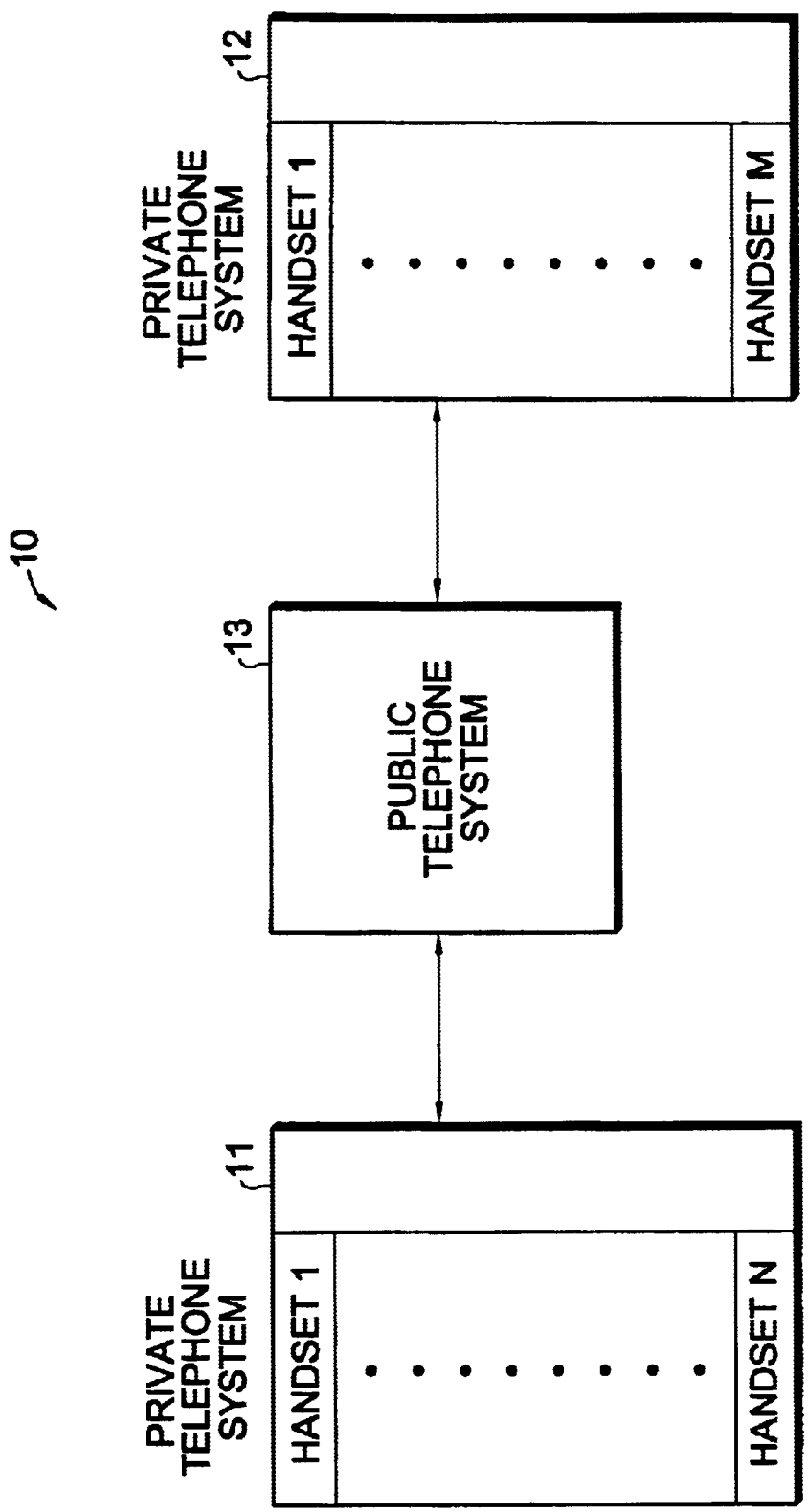
FIG. 1 provides a showing of a Wide Area Network (WAN) telephone system whereby two multiple telephone local area telephone networks (telephone LANs) in accordance with the invention are enabled to communicate with each other through the use of a telephone system.

FIG. 1 shows a Wide Area Network (WAN) telephone system 10 that includes the present invention. In system 10, two multiple handset Local Area Network (LAN) telephone systems 11 and 12, each LAN of which is constructed and arranged in accordance with the present invention, are enabled to intercommunicate through the use of another conventional and well-known telephone system 13.

Telephone system 10 can be characterized as a WAN wherein a relatively large number of telephones that are separated by large geographic distances are linked together, the linking being by way of telephone lines, and/or by way of radio communication. The construction and arrangement of these telephone systems can take many forms, including those that are well known in the art. Such a LAN 10 can have several known and different configurations or topologies. For purposes of drawing simplicity, only two telephone systems 11, 12 are shown in FIG. 1.

Each of the two telephone systems 11, 12 can be characterized as a LAN wherein a group of telephone terminals or handsets are linked together within a relatively small geographic area, such as a college campus or a multiple office business establishment. Within each LAN 11/12, interconnections are made by way of cables, wires, or radio. LANs 11/12 can also have several known and different configurations or topologies.

The two telephone systems or LANs 11 and 12 are physically located to service two different commercial organizations, offices, or the like, wherein each individual commercial organization is provided with a plurality of telephone handsets that enable telecommunication within the organization. Telephone system 11 is shown as having the number N of individual telephone handsets, and telephone system 12 is shown as having the number M of individual telephone handsets. By way of example, each telephone handset within a LAN system 11/12 is located in a different user office of a given commercial organization or establishment.

In accordance with the invention, any calling handset within a telephone system 11/12 can communicate with any other receiving handset within that telephone system, or in the case of a conference call, can communicate with a selected number of receiving handsets within that telephone system, using ringing information that specifies a ringing indication that is selected by the user of the calling handset prior to placing a call to the receiving handset(s).

As will be apparent in accordance with the invention, the ringing indication that is specified in ringing information can be selected by a calling user from a predefined set of ringing indication as a call is being placed, or the ringing indication that is specified in ringing information can be defined by the calling user as the call is being placed, or the ringing indication that is specified in ringing information can be selected from a predefined set of ringing indications that have been pre-established by the receiving user for utilization in accordance with a call type that is assigned by the calling user as the call is being placed.

Thereafter, when the calling circuit is completed to the receiving handset, the attention of the user at the location of the receiving handset is captured or awakened by the ringing indication(s). In accordance with a protocol that has been pre-established throughout the telephone system, prior to the receiving user acknowledging the call by picking up the handset, the receiving user is informed of the origin of the call, of the priority of the call, and/or of the occurrence of a special event, all of which are indicated in accordance with the protocol by the ringing indication(s).

While the invention will be described using "ready made" ringing indications that are stored in electronic storage files 22, it is within the spirit and scope of the invention that a calling user located at a calling handset can provide a self-recorded ringing indication message such as "Happy Birthday" or "Let's go to lunch". In this embodiment of the invention, the self-recorded message is provided during the process of placing a call to a receiving handset, and the self-recorded message is then provided to the receiving user at the location of the receiving handset when the call is received.

Figure 2:
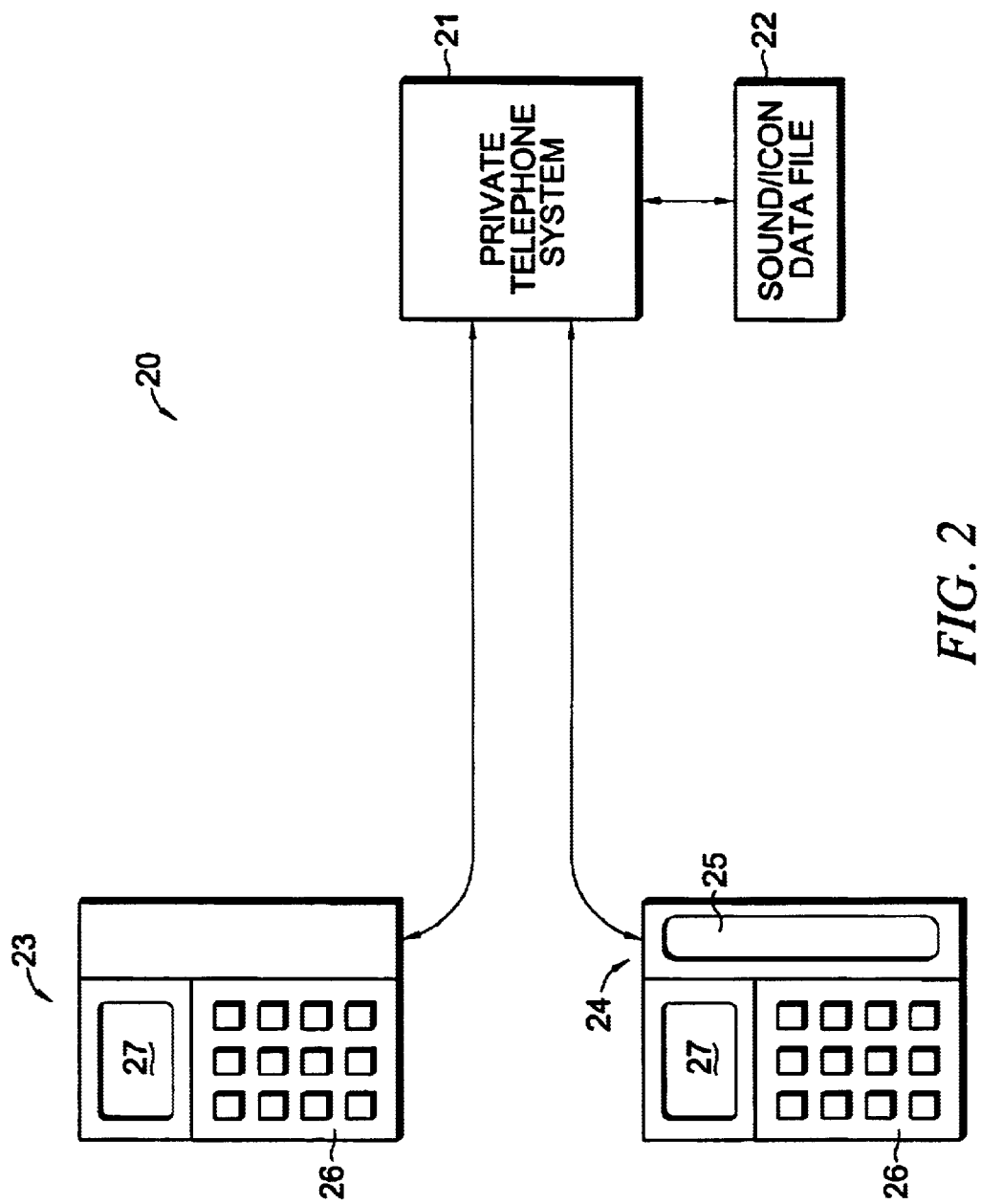
FIG. 2 provides a showing of one of the two FIG. 1 LAN telephone systems wherein a first and a second telephone handset are enabled in accordance with the invention to select a ringing information that specifies a ringing indication, an identification of the selected a ringing information then being sent from a calling handset to a receiving handset, whereupon the receiving handset operates to retrieve the selected ringing indication(s) from a data file.

FIG. 2 shows one of the two FIG. 1 LAN telephone systems 11/12. In FIG. 2, LAN telephone system 20 includes a well-known hardware/software telephone system element 21 that is connected to service all of the telephone handset terminals that are within LAN system 20. While LAN systems 11/12 of FIG. 1 and 20 of FIG. 2 are shown as wire-bound systems, within the spirit and scope of this invention these telephone systems can be of the radio telephone type.

In accordance with the invention, an electronic file, digital storage file, or data file 22 contains a plurality of digital representations of a plurality of different ringing indications that have been established in accordance with the above mentioned protocol. Desirably, this protocol is known to all of the users, or at least some of the users, within LAN system 20. Details of the audio characteristics and/or the visual characteristics that make up the ringing indications are not important to the spirit and scope of the invention.

While one electronic storage file 22 is shown as servicing all telephone handsets within LAN 20, it is within the spirit and scope of this invention to also provide such an electronic storage file 22 at the location of all of, or only selected ones of, the individual telephone handsets that are within telephone LAN 20.

While telephone system 20 services a large number of individual handset terminals, only two handset terminals 23 and 24 are shown in FIG. 2 for purposes of drawing simplicity. Each of the two handset terminals 23, 24 includes a conventional handset 25, a conventional 12-key pad 26, and a conventional visual screen 27. As above stated, each of the two handset terminals 23, 24 may also include a data file 22 in accordance with this invention.

Assume now that the user at handset 23 desires to place a call to the user at handset 24.

When the user at handset 23 does not desire to make use of data file 22, this user merely places or "dials" the call in the conventional and well-known manner.

However, when the user at handset 23 desires to provide a ringing information that specifies a ringing indication to the user at handset 24, the user at handset 23 first selects a ringing indication(s) from data file 22; i.e., the caller uses his/her telephone to select the relevant option(s) from data file 22.

The manner in which data file 22 is accessed by the user at handset 23 is not critical to the spirit and scope of this invention. For example, handset 23 may be provided with a special access key 28, or the user at handset 23 may access data file 22 by entering a special 4-digit code by way of key pad 26.

After the user at handset 23 has indicated a desire to make a selection(s) from data file 22, the user selects desired a ringing indication(s) by way of the manual actuation of key pad 26, these key pad entries operating to select the desired ringing indication(s). For example, a list of possible ringing indication selections, and corresponding key strokes, can be provided to the user by way of a printed list, or by way of a list that appears on screen 27. After the user has completed a selection(s), or in the event that the user wishes to abort the selection process, and if desired, an ending key pad entry may be used to indicate that the selection process has been completed/aborted, whereupon the user at handset 23 may now enter the telephone number of handset 24.

In completing the circuit from handset 23 to handset 24, telephone system 21 fetches the selected ringing indication(s) from data file 22, whereupon the selected ringing information is sent to handset 24. In accordance with the present invention, handset 24 is now activated in the manner of the ringing indication(s) that was selected by the calling user at handset 23. Note that receiving handset 24 operates to suspend the call-received process until the ringing indication(s) from data file 22 has been received by handset 24.

In summary, prior to actually dialing handset terminal 24, and in accordance with a mode of operation that is provided by the present invention, handset terminal 23 is first used to make a selection(s) from the plurality of ringing indication that is stored in data file 22. After the user at handset terminal 23 has completed a ringing indication selection from data file 22, the user at handset terminal 23 dials the phone number of handset terminal 24. Prior to indicating to the user of handset terminal 24 that an incoming call has arrived, the selected ringing indication(s) is fetched from data file 22, whereupon handset terminal 24 is activated in accordance with the ringing indication selection(s) that was made by the user at handset terminal 23.

In this manner, the user at receiving handset terminal 24, who is also aware of the data file 22 protocol that is used within LAN telephone system 20, is provided with selected ringing indication(s), the selected ringing indication(s) being sent at the request of calling handset terminal 23 to announce the arrival of a incoming call at receiving handset terminal 24.

Figure 3:
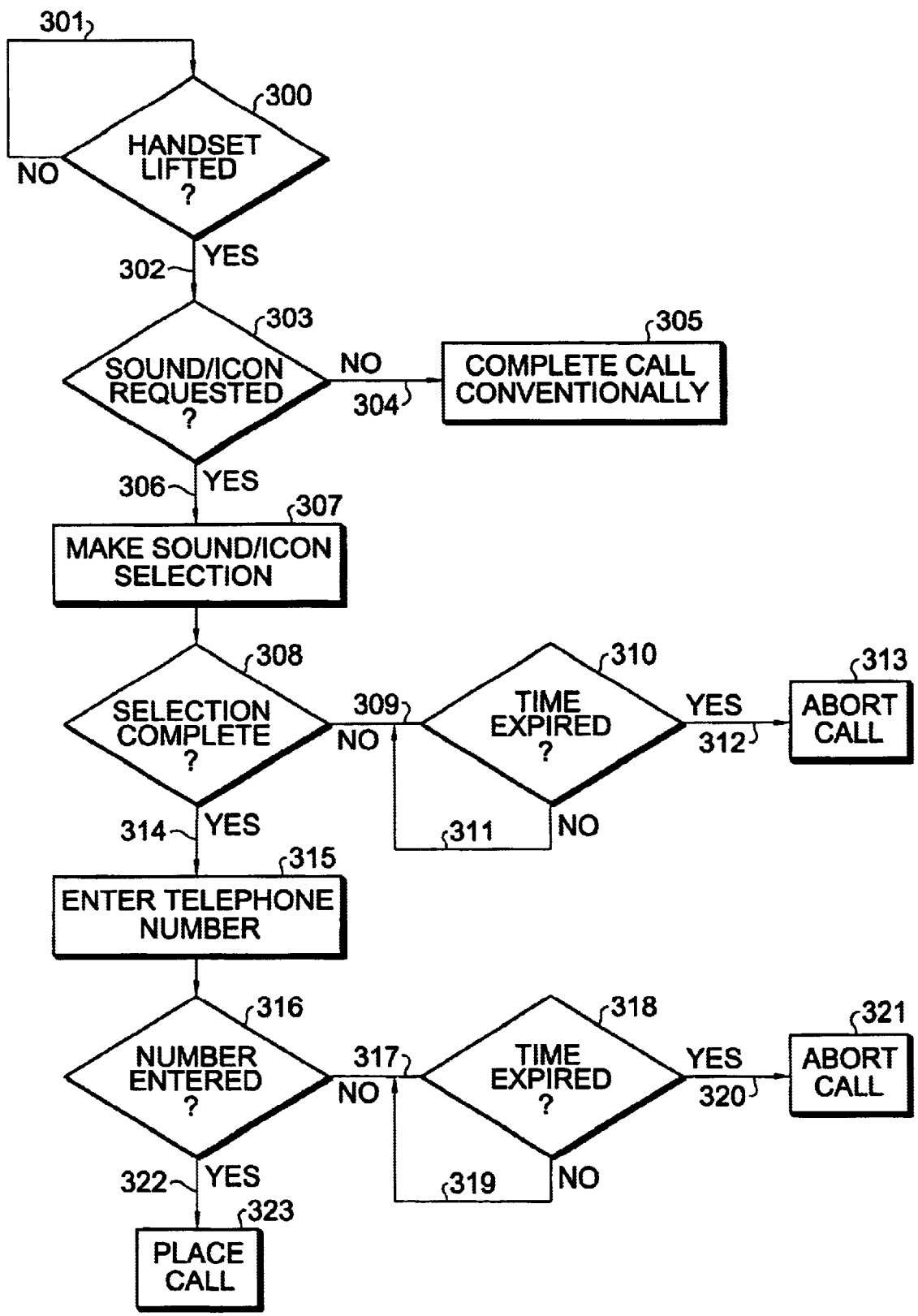
FIG. 3 is a flowchart that shows the operation of the invention when telephone terminal 23 of FIG. 2 is used to place a call to telephone terminal 24 of that figure.

FIG. 3 is a flowchart that shows the operation of the present invention at a calling telephone terminal or handset, such as handset 23 of FIG. 2. Decision function 300 monitors or looks for lifting of the handset 25 of calling handset 23 as a calling user begins a process by which a call is placed to handset 24 of FIG. 2. That is, assume that handset 25 of telephone 23 is lifted by a calling user in preparation for placing a telephone call to a receiving user at telephone 24. As long as the lifting of handset 25 is not detected, looping circuit 301 remains enabled by the NO output of function 300.

When the YES output 302 of function 300 is enabled, decision function 303 operates to determine if the calling user has requested access to data file 22, as above described. The NO output 304 of decision function 303 indicates that the calling user does not wish to provide customized ringing indication at the location of the receiving user. In this case, function 30 is enabled to complete the call from calling telephone terminal 23 to receiving or called telephone terminal 24 in a conventional and well-known manner.

In the event that the calling user has requested access to the FIG. 2 data file 22, YES output 306 of decision function 303 enables the user at telephone terminal 23 to make a selection of a ringing information that specifies a ringing indication from data file 22 by way of function 307.

Decision function 308 now operates to monitor the completion of function 307. That is, until such time as decision function 308 is satisfied, NO output 309 enables a decision function 310 to determine if a given time interval that is allowed for the completion of the function 307 selection process has expired. The NO output 311 of decision function 310 enables a loop of function 310, whereas the YES output 312 enables a call abort function 313, as is well known in the art.

Now assume that YES output 314 of decision function 308 is activated as a result of the calling user completing a selection(s) from data file 22 at function 307. In this case, function 315 is enabled to allow the user at telephone terminal 23 to enter the telephone number of telephone terminal 24, and decision function 316 is enabled to monitor the completion of function 315. That is, until such time as decision function 316 is satisfied, NO output 317 enables decision function 318 to determine if a given time interval that is allowed for the completion of function 315 has expired. The NO output 319 of decision function 318 enables a loop of function 319, whereas the YES output 320 enables a call abort function 321, as is well known in the art.

However, as is the usual case, the YES output 322 of decision function 316 enables function 323 to place a call from telephone terminal 23 to telephone terminal 24 using the ringing indication selection of function 307, and the telephone number entered at function 315.

Figure 4:
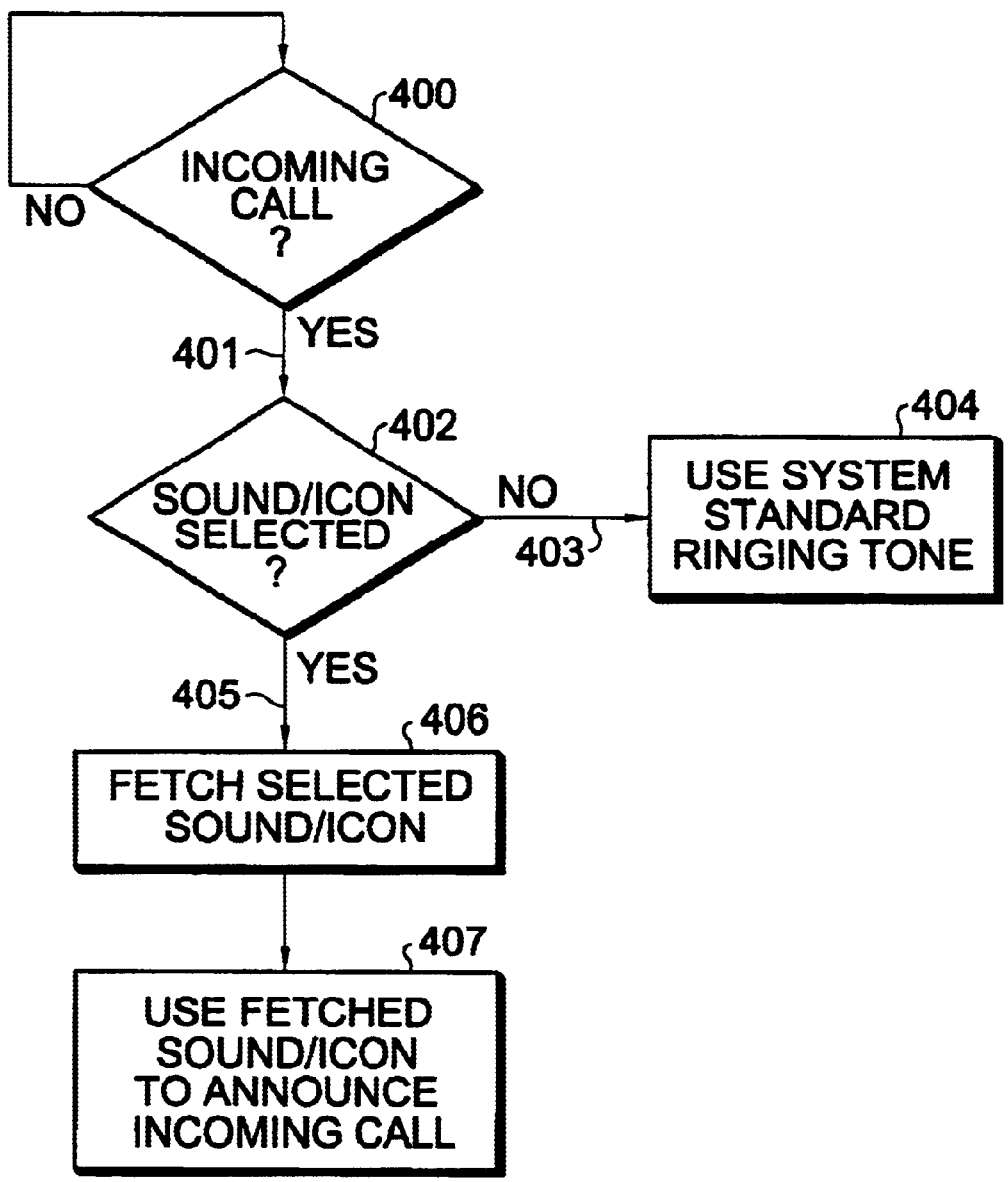
FIG. 4 is a flowchart that shows the operation of the invention when telephone terminal 24 of FIG. 2 receives a telephone call from telephone terminal 23 as shown in FIG. 3.

FIG. 4 provides a flowchart that shows the operation of the present invention at receiving or called telephone terminal 24. Decision function 400 awaits the arrival of the telephone call that was placed by function 305 or by function 323 of FIG. 3.

When telephone terminal 24 receives an incoming call, the YES output 401 of decision function 400 is enabled, whereupon decision function 402 operates to interrogate the incoming call to determine whether or not selection of a ringing information that specifies a ringing indication is included within the incoming call. That is, decision function 402 answers the question, does the incoming call include a FIG. 3 selection 307, or is the incoming call a result of the operation of FIG. 3 function 305?

When the incoming call is the result of the operation of FIG. 3 function 305, NO output 403 of decision function 402 enables function 404 to announce or signal the arrival of the incoming call using a standard ringing tone at telephone terminal 24.

However, when the incoming call is the result of the operation of FIG. 3 function 323, the YES output 405 of decision function 402 enables function 406 to fetch the selected ringing indication from data file 22, followed by function 407 operating to announce or signal the arrival of the incoming call by playing and/or displaying (i.e., by using) the selected ringing indication at telephone terminal 24, as was selected at function 307 of FIG. 3.

FIG. 5 shows a screen display 500 that appears at one of screens 27 of FIG. 2 handset terminals 23, 24, this figure showing four missed calls that have been stored at a receiving handset terminal, along with the name of the person originating each call, the time of arrival of each call, and in the case of three of the calls, a priority icon for each of the three calls.

As explained above, for the first-listed call received at 12:32, a calling user Mary Hoppins selected a normal priority icon 501 from data file 22 prior to completing the call. By way of example only, normal priority icon 501 is a vertically-extending line. Of course, this first-listed call may have been accompanied by ringing information such as ringing indication that was selected from data file 22, but the receiving user either was not present at the time the call was received, or the receiving user elected to ignore the incoming call.

For the second-listed call received at 12:15, a calling user Mike O' Connor made no selection from data file 22 prior to completing the call. Again, this second-listed call may have been accompanied by ringing indication that was selected from data file 22.

For the third-listed call received at 11:14, a calling user Pete Jones selected a low-priority icon 502 from data file 22 prior to completing the call. By way of example only, low-priority icon 502 is a vertically-extending and down-pointing arrow. Again this third-listed call may have been accompanied by ringing indication that was selected from data file 22.

For the fourth-listed call received at 10:00, a calling-user Jane Doe selected a high-priority icon 503 from data file 22 prior to completing the call. By way of example only, high-priority icon 503 is a well-known exclamation symbol. Again this third-listed call may have been accompanied by ringing indication that was selected from data file 22.

Figure 6:
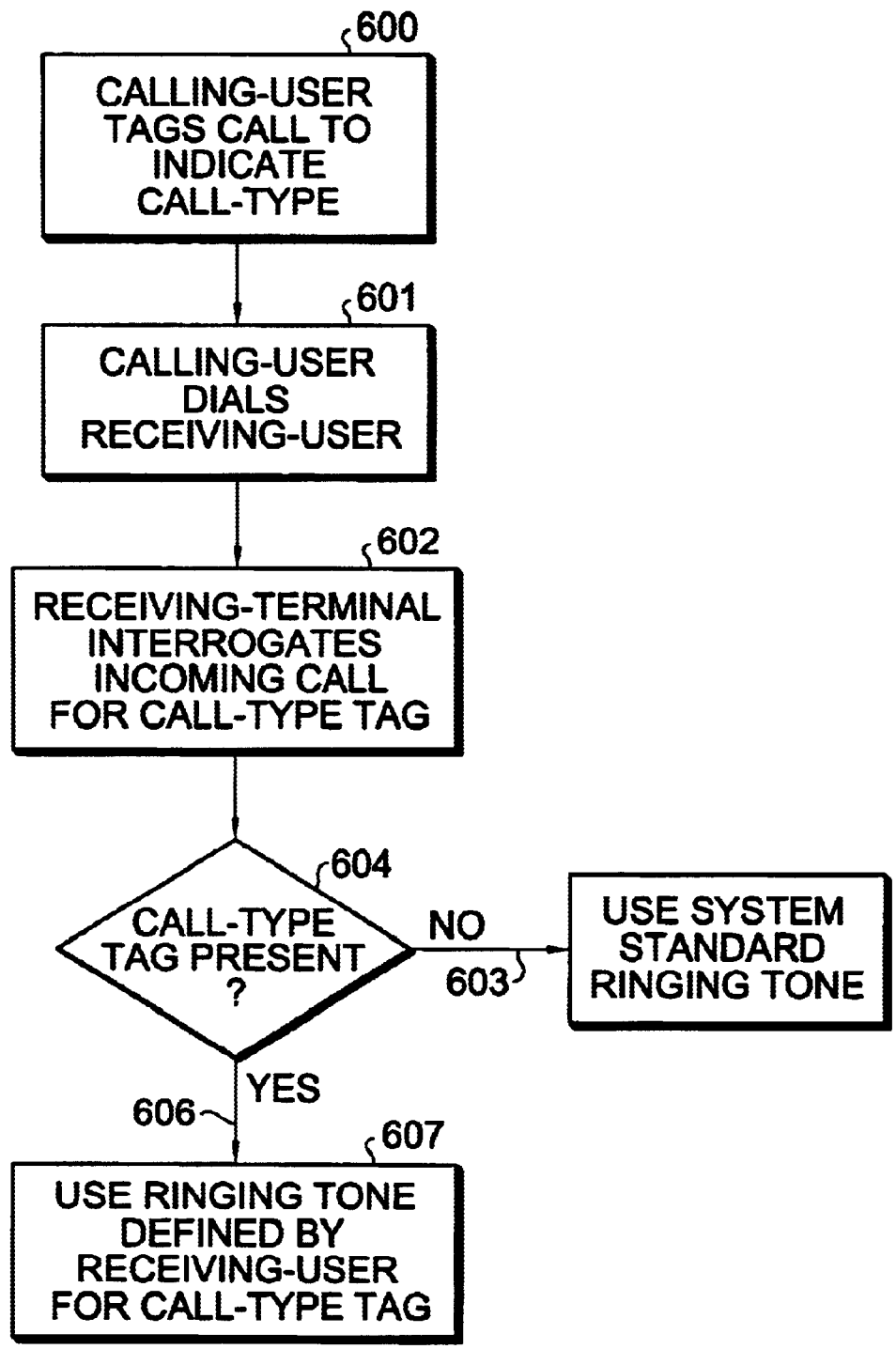
FIG. 6 shows an embodiment of the invention wherein the ringing information that specifies a ringing indication that is activated at a receiving telephone terminal is predefined by the receiving user.

FIG. 6 shows an embodiment of the invention wherein the ringing indication (sound and/or visual) that is activated at a receiving telephone terminal is a ringing indication that has been predefined by the receiving user in accordance with the class of the incoming call, which call class is assigned by the calling user as the call is placed to the receiving user.

In this FIG. 6 embodiment of the invention, at least some of the system users have loaded a data file 22 in order to identify what type of ringing indication they wish to have activated at their telephone terminal in accordance with a tag or a sign that has been appended to an incoming call by a calling user.

That is, the calling user selectively operates, prior to dialing the telephone number of the receiving telephone terminal, to append a tag or a sign as ringing information that operates to identify a call type. For example, the calling user may tag or sign the call to be placed as a business call, a personal call, a private call, a priority call, etc.

In accordance with this embodiment of the invention, the receiving user has pre-programmed the receiving telephone terminal to interrogate all incoming calls to determine if the ringing information of incoming call contains a tag or a sign. If no such tag or sign is found, the incoming call is announced at the receiving telephone terminal by the sounding of a standard ringing tone. However, when a tag or sign is found, then the sound information and/or the visual information that is used to announce the incoming call is in accordance with the ringing indication that the receiving user has predefined for the type of call that is defined by the found tag or sign.

With reference to FIG. 6, at event 600, a calling user operates to tag or to sign a call that is to be placed to a given receiving user. After the call has been tagged or signed, the calling user operates at event 601 to dial the telephone number of the telephone terminal that is at the physical location of the given receiving user.

At event 602, the incoming call is received at the receiving telephone terminal whose number was dialed at event 601, and the receiving telephone terminal operates to interrogate the incoming call to determine if the incoming call contains a call type tag or a call type sign.

When no such tag or sign is found in the incoming call, the NO output 603 of decision event 604 operates at event 605 to announce the incoming call by sounding a standard ringing tone at the receiving telephone terminal.

However, when such a tag or sign is found in the incoming call by decision event 604, its YES output 606 enables event 607 to fetch a ringing indication(s) from data file 22, which ringing indication(s) has been predefined by the user at the receiving telephone terminal in accordance with a plurality of tags or signs that may be selectively appended to incoming calls by calling users.

Appendix A comprises three selected pages taken from a document entitled Session Initiation Protocol. Appendix A is related to the above-described priority of a call.

The present invention has been described in detail while making reference to preferred embodiment thereof. Since it is known that others skilled in the related art will, upon learning of this invention, visualize yet other embodiments that are within the spirit and scope of this invention, the above detailed description is not to be taken as a limitation on the spirit and scope of this invention.

What is claimed is:

1. In a telephone system having a plurality of telephone terminals that are interconnected to a telephone network having a normal ringing indication for normal use at a receiving telephone terminal when a telephone call is received from a calling telephone terminal, an improvement of apparatus for enabling a calling user operating the calling telephone terminal to selectively cause announcement through a ringing indication that is distinguishable from the normal ringing indication for normal use, at the receiving telephone terminal, said apparatus comprising:

first control means at said calling telephone terminal, said first control means for selecting ringing information to be associated with the telephone call, said ringing information comprising for telling the receiving telephone terminal where to fetch the ringing indication, and, for subsequently placing the telephone call to the receiving telephone terminal; and second control means at the receiving telephone terminal, said second control means operable responsive to receiving the telephone call placed to the receiving telephone terminal, the telephone call containing said ringing information, causing the receiving telephone terminal to announce the telephone call placed from the calling telephone terminal by fetching the ringing indication based on said provided ringing information at the receiving telephone terminal.

2. The improvement of claim 1 wherein said ringing information that specifies a ringing indication is defined by a user located at the calling telephone terminal in accordance with a telephone network protocol.

3. The improvement of claim 1, further comprising:

a data file storing a plurality of ringing indications that are each different than said normal ringing indication, said plurality of ringing indications being for selective use within the telephone network; and wherein the receiving telephone terminal is operable to fetch at least one of said plurality of ringing indications from said data file according to said ringing information contained in the telephone call.

4. A method for use in a telephone system, the telephone system having a plurality of telephone terminals, for optionally identifying at a receiving telephone terminal a selected ringing indication in accordance with selective operations of a calling telephone terminal, said method comprising the steps of:

providing a plurality of different ringing indications, each ringing indication providing for a different announcement in accordance with a telephone system protocol;

providing first means at the calling telephone terminal whereby the calling telephone terminal optionally preselects ringing information that specifies a ringing indication and thereafter places a call to the receiving telephone terminal;

providing second means at the receiving telephone terminal responsive to failure of said first means to preselect the ringing information that specifies a ringing indication thereby to cause the receiving telephone terminal to announce the placed call by activating a standard ringing indication at the receiving telephone terminal; and providing third means at the receiving telephone terminal responsive to selection of the ringing information by said first means, thereby to cause announcement of the call at the receiving telephone terminal by fetching said selected ringing indication based on said provided ringing information.

5. The method of claim 4 wherein said selected ringing indication based on said provided ringing information is selected from the group visual information item and sound information item.

6. The method of claim 5 wherein said announcement at the receiving telephone terminal comprises sound information that identifies said calling telephone terminal and/or visual information that indicates a priority of said placed call.

7. The method of claim 6 wherein at least some of said different ringing indications identify different events for selective announcement at the receiving telephone terminal.

8. The method of claim 4 wherein said different ringing indications include a plurality of sound information that are each different than said standard ringing indication and that each identify a user of a telephone terminal within the telephone system.

9. Apparatus enabling a receiving telephone handset to choose a ringing information that specifies a ringing indication to be activated thereat in accordance with a call type of an incoming call, comprising:

a telephone system including a plurality of telephone handsets for selectively placing a call from a calling-telephone handset to a receiving-telephone handset, the placed call normally being announced by activating a standard ringing indication at said receiving-telephone handset;

a data file containing a plurality of different indications that are both different from each other and different from said standard ringing indication;

wherein each of said plurality of different ringing indications is indicative of a different call type, and each of said plurality of different ringing indications being defined by a user at said receiving-telephone handset;

means at said calling-telephone handset for optionally enabling a user at said calling-telephone handset to specify a call type thereby to select a different ringing indication to be activated at the receiving telephone handset and, subsequent to pre-selecting, for placing the call, the call containing ringing information that includes the call-type selection to the receiving telephone hand set;

means at said receiving-telephone handset responsive to failure of said user at said calling-telephone handset to select a call type and operable to activate said standard ringing indication at said receiving-telephone handset to announce said placed call; and means at said receiving-telephone handset responsive to selection by said user at said calling-telephone for fetching said pre-selected ringing indication and announcing said placed call at said receiving-telephone handset.

10. A method enabling a ringing indication at a receiving telephone comprising means to cause announcement of an incoming call based on a provided ringing information to be fetched by the receiving telephone in accordance with a selecting operation that is performed at a calling telephone, said method comprising the steps of:

providing a data file containing a plurality of different ringing information that specifies different ringing indications, and providing means at the calling telephone for selecting the ringing information from said data file prior to placement of a call by the calling telephone to the receiving telephone.

11. The method of claim 10 wherein said different ringing indications individually correspond to a plurality of different call classes, and wherein said selected ringing information is defined by said calling telephone defining a call class for said call placed to said receiving-telephone.

* * * * *